Patented Apr. 26, 1932

1,855,676

UNITED STATES PATENT OFFICE

FRED HOLT AND JOSEPH ARTHUR MUSGRAVE WOODCOCK MITCHELL, OF RUNCORN, ENGLAND, ASSIGNORS TO IMPERIAL CHEMICAL INDUSTRIES LIMITED, OF LONDON, ENGLAND, A BRITISH COMPANY

COMPOSITIONS CONTAINING ALKALI METAL PEROXIDES

No Drawing. Application filed June 14, 1929, Serial No. 371,049, and in Great Britain July 23, 1928.

This invention relates to an improvement in compositions containing alkali peroxide or peroxides and especially to porous granular absorbents and oxygen evolving compounds suitable for use in respirators.

It is well known to charge respirators with granular sodium peroxide containing a catalyst or with a granular mixture of sodium peroxide and potassium peroxide. It is known that a suitable material may be made by grinding the product obtained by heating an alkali metal or mixture of alkali metals in layers in dry air and subsequently separating the granular material from the finer material which is produced in considerable quantity.

It is known to compress the finer material which may even be dust and may contain catalysts into pellets or cakes but the pellets or cakes so obtained are not so satisfactory as the porous granular product previously referred to, nor is the granular material obtained by grinding the pellets or cakes entirely satisfactory owing to its lack of porosity.

The compression of the fine material referred to is a difficult and disagreeable operation particularly when alkali peroxides or mixtures containing catalysts are treated.

It is the object of our invention to provide a process which will overcome these serious difficulties and according to the invention we agglomerate or frit the dust by a heating process which is preferably conducted at a temperature of 300° C. to 400° C. in presence of a flux so as to produce a porous mass, which is then ground or crushed. We avoid complete fusion which does not give the desired result.

The flux may already be present or may be formed therein or added thereto.

A powdered catalyst, which may or may or may not be anhydrous may be incorporated with the powder prior to the fritting operation or catalytic material may be added to the alkali metal prior to or during its oxidation.

The cooled fritted mass may then be disintegrated to produce a mixture of granular material, and fines which latter after separation can then be fritted either alone or after mixture with a further batch of the original powder.

A catalyst may be dusted over or otherwise added to the granules of fritted material after they have been separated from the finer material.

It is found that the granular material may become coloured owing to the presence of a catalyst and is characteristically colored by certain catalysts which become disseminated throughout the mass.

In a preferred form of the invention the dust or powdered sodium peroxide produced in any known manner is mixed with a suitable flux, e. g. powdered caustic soda or caustic potash, in a quantity of say 1%. A quantity say 3%, of a finely powdered known catalyst such as anhydrous manganese sulphate, is added and after thorough mixing the mass is heated for 1½ hours at a temperature of 300–400° C. when the material sinters or frits together. On cooling the fritted material is ground or crushed when the granules form the desired absorbent and oxygen evolving material while the fines are fritted.

It is not necessary specially to add a flux since this may be formed in the material itself by the absorption of water, followed by the heating; for example if the grinding of the original lump material is performed in atmospheric air sufficient moisture is absorbed to produce the necessary flux on heating, or again the moisture present in non-anhydrous catalysts also produces the necessary flux on heating.

The process is also applicable to the treatment of the fines of the mixed sodium-potassium peroxide and in this case it is not necessary to add a catalyst.

We declare that what we claim is:—

1. The process of preparing an oxygen-evolving preparation which consists in disintegrating alkali peroxide in lump form, separating the granular material from the fines and fritting the fines by heat treatment in presence of alkali hydroxide as a flux.

2. The process of preparing oxygen-evolving preparation which includes the step of fritting finely divided alkali peroxide by heat treatment in presence of alkali hydroxide formed by action of moisture on the finely divided alkali peroxide.

3. The process of preparing oxygen-evolving preparation which includes the step of fritting finely divided alkali peroxide by heat treatment at about 300°–400° C. in presence of alkali hydroxide as flux, so as to produce a fritted mass which is capable of being disintegrated to yield a large proportion of granules.

4. The process of preparing an oxygen-evolving preparation which includes the step of fritting finely divided alkali peroxide by heat treatment in presence of alkali hydroxide as flux to produce a porous mass.

5. The process of preparing a granular oxygen-evolving preparation containing a catalyst which includes the steps of fritting finely divided alkali peroxide by heat treatment in presence of alkali hydroxide as flux, and disintegrating the fritted material to form granules, said catalyst being added at any stage of the process.

In witness whereof, we have hereunto signed our names this 30th day of May, 1929.

FRED HOLT.
JOSEPH ARTHUR MUSGRAVE WOODCOCK MITCHELL.